United States Patent [19]

Webb

[11] 4,117,994

[45] Oct. 3, 1978

[54] PARACHUTE WITH CANOPY OPENING ASSIST AND OPENING CONTROL

[75] Inventor: David B. Webb, Fort Erie, Canada

[73] Assignee: Irvin Industries Canada Ltd., Fort Erie, Canada

[21] Appl. No.: 808,605

[22] Filed: Jun. 21, 1977

[51] Int. Cl.$^2$ .............................................. B64D 17/08
[52] U.S. Cl. .................................................. 244/152
[58] Field of Search ................ 244/142, 145, 152, 149

[56] References Cited

U.S. PATENT DOCUMENTS

| 2,384,127 | 9/1945 | Nailor | 244/152 |
|---|---|---|---|
| 2,566,585 | 9/1951 | Smith | 244/152 |
| 2,754,074 | 7/1956 | Schade | 244/152 |
| 2,972,457 | 2/1961 | Steinthal | 244/152 |
| 3,041,022 | 6/1962 | Sepp, Jr. | 244/152 |
| 3,298,640 | 1/1967 | Heinrich | 244/145 |

FOREIGN PATENT DOCUMENTS

| 66,240 | 10/1928 | Sweden | 244/152 |
|---|---|---|---|
| 256,851 | 1/1931 | Italy | 244/142 |

Primary Examiner—Galen L. Barefoot
Attorney, Agent, or Firm—McAulay, Field, Fisher & Goldstein

[57] ABSTRACT

The parachute opening assist and control arrangement is a small auxiliary canopy in combination with a series of transverse reefing lines. The auxiliary canopy is folded within the main canopy and is connected to the reefing lines. Each reefing line is connected between two opposed main support lines. When the parachute is fully open, the reefing lines are a series of transverse lines which cross each other at a central point. The ends of the reefing lines are connected to the main support lines at a point close to the skirt of the main canopy. The auxiliary canopy extends above the reefing lines. A positioning line is connected between the crown of the main canopy and the center point of the reefing lines. The positioning line may be foreshortened to increase the reefing effect during canopy opening. The auxiliary canopy and reefing lines together increase the speed of initial opening and control the opening to reduce the maximum shock during opening.

19 Claims, 11 Drawing Figures

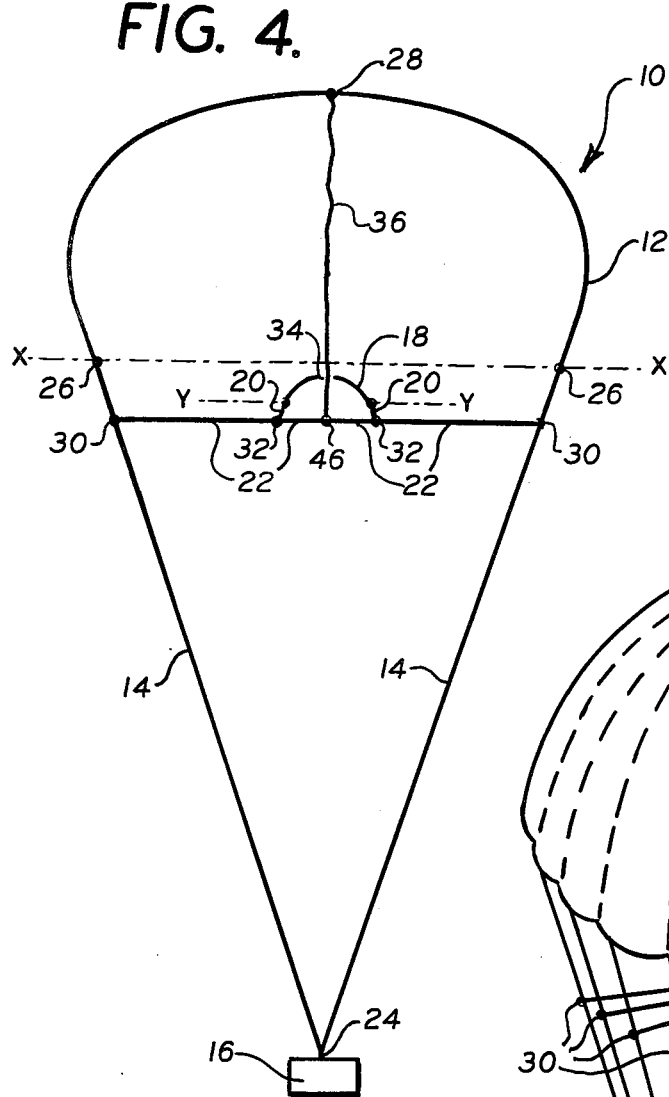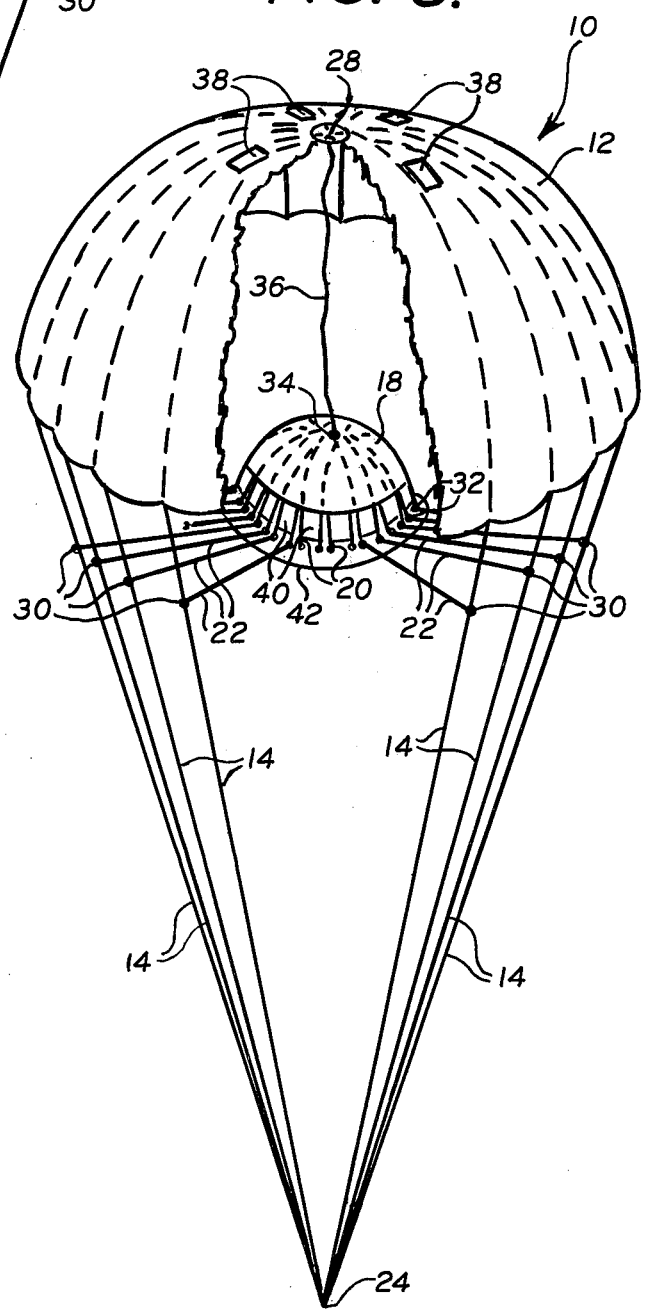

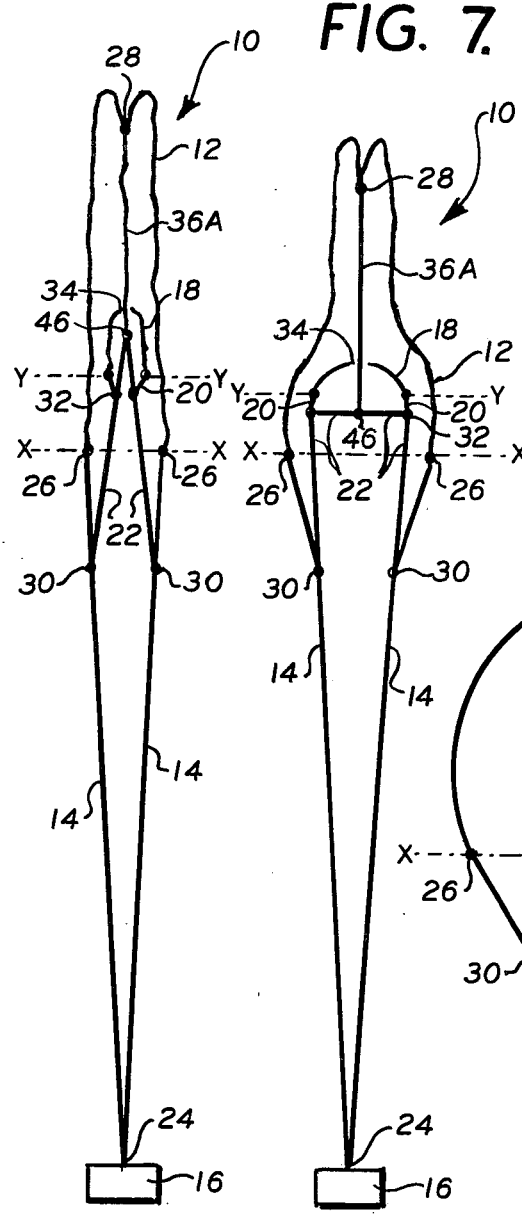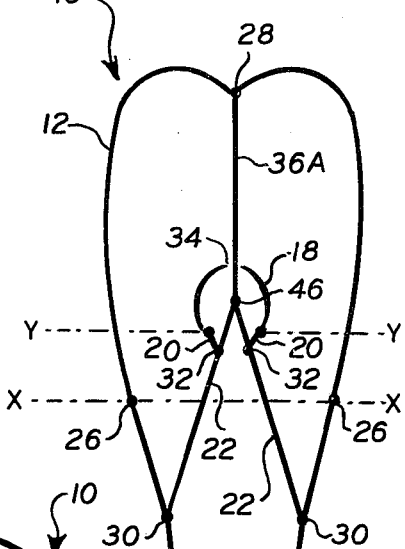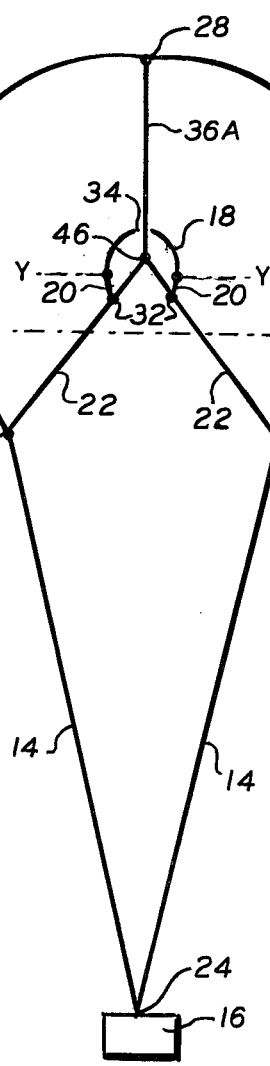

PARACHUTE WITH CANOPY OPENING ASSIST AND OPENING CONTROL

BACKGROUND OF THE INVENTION

This invention relates to parachutes and more particularly to a canopy opening assist and control arrangement for limiting the opening shock when a parachute is opened rapidly.

The concept of using some technique to assist in the initial opening of the mouth of a parachute is known. What is used is a small auxiliary parachute shaped canopy that has a series of lines which are connected to the confluence point of the load lines of the main canopy. This auxiliary parachute is positioned, when the parachutes are folded or squidded, near the mouth of the main parachute. In the initial stages of opening, the auxiliary parachute opens immediately thereby making sure that the mouth of the main parachute opens immediately. The faster opening attained by this technique generally results in an opening shock increase of approximately 10% when the parachute opens at air speeds of 120 to 130 knots. This increase in opening shock limits the benefits of this type of auxiliary canopy to applications where the air speed on opening is no greater than approximately 130 knots.

Accordingly, one of the major purposes of this invention is to provide a means to assist in the opening of the mouth of the parachute which avoids increasing the opening shock particularly at high air speeds, meaning speeds above 130 knots.

One of the conditions under which high air speed opening occurs is after a pilot is ejected from an airplane. Under such conditions, the air speed at the time of parachute deployment is frequently 300 knots or more. Yet a pilot sometimes has to be ejected from an airplane when the airplane is flying at a relatively slow speed and at a low altitude. Thus it is important that the parachute open as soon as possible and an opening assist mechanism is of considerable importance. The prior art opening assist mechanisms tend to cause the opening to proceed at a rate which creates a substantial increase in opening shock. This increased opening shock is highly dangerous for the individual at the higher ejection speeds.

Accordingly, it is a related purpose of this invention to provide a parachute opening assist mechanism which can safely be used with a pilot ejector mechanism at various combinations of ejection speeds and altitudes, including relatively low speed at low altitude and relatively high speed at any altitude.

The uncontrolled or uneven, ragged opening of a parachute at high speeds is one of the major factors causing what are known as blown peripheries. These blown peripheries occur because a portion of the skirt of the canopy is blown inwardly through the space under the mouth and around another portion of the skirt.

Accordingly, another purpose of this invention is to control the opening of a parachute to decrease the risk of blown peripheries.

More specifically, it is a purpose of this invention to control the opening of the parachute in order to obtain repeatable air inflow conditions and hence repeatable, controlled opening times and opening loads.

In this application, certain terms will be used in the following fashion.

Folded refers to the condition where the parachute is entirely folded as it is when in the pack.

Deployed refers to the state when the parachute is first opened and the canopy material is strung out above the load or pilot but where there is little or no air in the parachute.

Squidded refers to the state immediately after the deployed state where there is some air in the canopy and its configuration is approximately cylindrical.

Reefing herein refers to the pulling in of the mouth of the canopy. It also refers to the restricting of the mouth of the canopy to less than its full projected area during terminal descent.

BRIEF DESCRIPTION

In one embodiment, the canopy opening assist arrangement is a small auxiliary canopy folded within the main canopy of the parachute. This auxiliary canopy aids in the initial opening of the mouth of the main canopy and thereby decreases the initial opening time.

A set of lateral lines are connected across the main support lines. Each lateral line has one end connected to a first of the main support lines and its other end connected to a second of the main support lines spaced 180° around the skirt of the main canopy from the first support line. These lateral lines are close to horizontal when the parachute is in its fully open state. The auxiliary canopy has canopy lines which are connected to the lateral lines at points close to the center of the lateral lines. Thus, when the parachute is squidded or deployed, the lateral lines extend up into the main canopy where they are connected to the auxiliary canopy lines. During the opening process, these lateral lines tend to reef (pull in) the main support lines and thus slow down the rate of the parachute opening after the auxiliary canopy has inflated. Accordingly, these lateral lines are called herein reefing lines.

The rapid initial opening of the mouth of the parachute results from the extremely rapid opening characteristic of the small auxiliary canopy. The auxiliary canopy is close enough to the mouth of the main canopy when both are in the squidded condition so that, as the auxiliary canopy opens, it and/or the reefing lines push the mouth of the main canopy open.

During the initial stages of parachute opening, the air speed is relatively high because the braking effect of the partially opened parachute is limited. Because of the relatively high air speed when the auxiliary canopy initially opens, the auxiliary canopy exerts a substantial force which is transmitted through the auxiliary canopy lines to the reefing lines. As a consequence, the reefing lines are pulled up and in thereby reef in the support lines of the main canopy. The result is that the rate of inflation of the main canopy is slowed at just the stage where the maximum shock occurs. The result is reduced opening shock.

The auxiliary canopy thus accelerates the initial stages of opening of the parachute and then, through the reefing lines, introduces a delay in completion of opening to reduce opening shock.

Once the main canopy has fully opened and has brought the air speed down to the terminal descent velocity, the drag due to the auxiliary canopy is minimum because the auxiliary canopy is relatively small and the air speed is relatively low. Thus, once fully opened, the reefing lines have little or no effect on the main support lines. It is only during the intermediate stages of opening when air speed is substantial that the reefing lines are effective to pull in the main support lines. the auxiliary chute and the reefing lines tend to prevent what is known as blown peripheries. At times, when a parachute is deployed raggedly or unevenly, a portion of the skirt will blow through the support lines and blow up around another portion of the skirt. This is a known phenomenon and produces known problems. The auxiliary canopy and the reefing lines tend to block the skirt from doing this. Furthermore, because the reefing lines exert tension of the main load lines, they tend to pull the main load lines into place so that the main load lines are all relatively evenly spaced from one another with the result that the main load lines tend to keep each skirt sector in a position which minimizes the blow through that causes blown peripheries.

In addition, during the early stages of opening, this tensioning of the main chute load lines by the reefing lines tends to create a symmetrical opening which minimizes the risk of having what is known as a false apex. A false apex occurs when the initial inrush of air is off center and hits the side of the canopy. This causes an excessive force and strain on the canopy which can result in tearing the canopy. When the canopy opening is symmetrical, the initial inrush of air hits the canopy around the central vent where the canopy is designed to take this force.

The auxiliary canopy and reefing lines together aid in controlling the shape and size of the initial opening of the mouth of the main canopy. This control permits a design in which the range of opening time is reduced because the initial opening is repeatable and consistent. This control also reduces the incidence of what are known as blown peripheries and false apex as well as reducing the variation of opening load.

A vertical positioning line is connected between the central point at which the reefing lines all cross and the central point at the apex of the main canopy. This positioning line passes through a central opening at the apex of the auxiliary canopy. The positioning line serves in part to center and position the reefing lines and auxiliary canopy and to assure that they remain up within the main canopy during the opening process. A foreshortened and straightened positioning line will cause additional reefing, after the auxiliary canopy has opened, during various stages of parachute inflation and can thus be used to provide enhanced control.

BRIEF DESCRIPTION OF THE DRAWINGS

FIGS. 1 through 5 illustrate one embodiment in which FIG. 1 is a schematic view illustrating the relationship of elements in the squidded state.

FIG. 2 is a schematic view during an early stage of inflation after the FIG. 1 condition. FIG. 2 indicates the stage at which the auxiliary canopy and reefing lines have completed their function of opening the mouth of the main canopy.

FIG. 3 schematically illustrates an intermediate stage or inflation in which the reefing lines exert a significant reefing force on the main load lines of the parachute.

FIG. 4 schematically illustrates the fully inflated condition in which the reefing lines exert practically no reefing force on the main support lines. The reefing lines are nearly horizontal and normal to the axis of the two canopies. The FIG. 4 stage is one where the parachute has slowed to its terminal descent velocity.

FIG. 5 is a perspective view of the FIG. 4 stage in which certain details of a preferred auxiliary canopy are shown; specifically the use of a series of flaps at the skirt of the auxiliary canopy to provide stability.

FIGS. 6 through 11 illustrate a further embodiment similar to that of FIGS. 1 - 5 except for the use of a foreshortened positioning line to provide additional reefing. FIG. 6 is a schematic view illustrating the relationship of the elements in the squidded state.

FIG. 7 is a schematic view during an early stage of inflation indicating the stage at which the auxiliary canopy and reefing lines have completed their function of opening the mouth of the main canopy.

FIGS. 8 and 9 schematically illustrate intermediate stages of inflation in which the reefing lines exert a significant reefing force on the main lines of the parachute due to the combined effect of the auxiliary canopy and the foreshortened positioning line.

FIG. 10 schematically illustrates the fully inflated condition in which the reefing lines continue to exert a slight reefing force on the main support lines through the effect of the foreshortened vertical positioning line which is connected to the apex of the main canopy. The FIG. 10 is one where the parachute has slowed to its terminal decent velocity.

FIG. 11 is a perspective view of the FIG. 10 stage in which certain further details of a preferred auxiliary canopy are shown; specifically, the use of a series of flaps at the skirt of the auxiliary canopy in order to provide stability.

Figure 11:
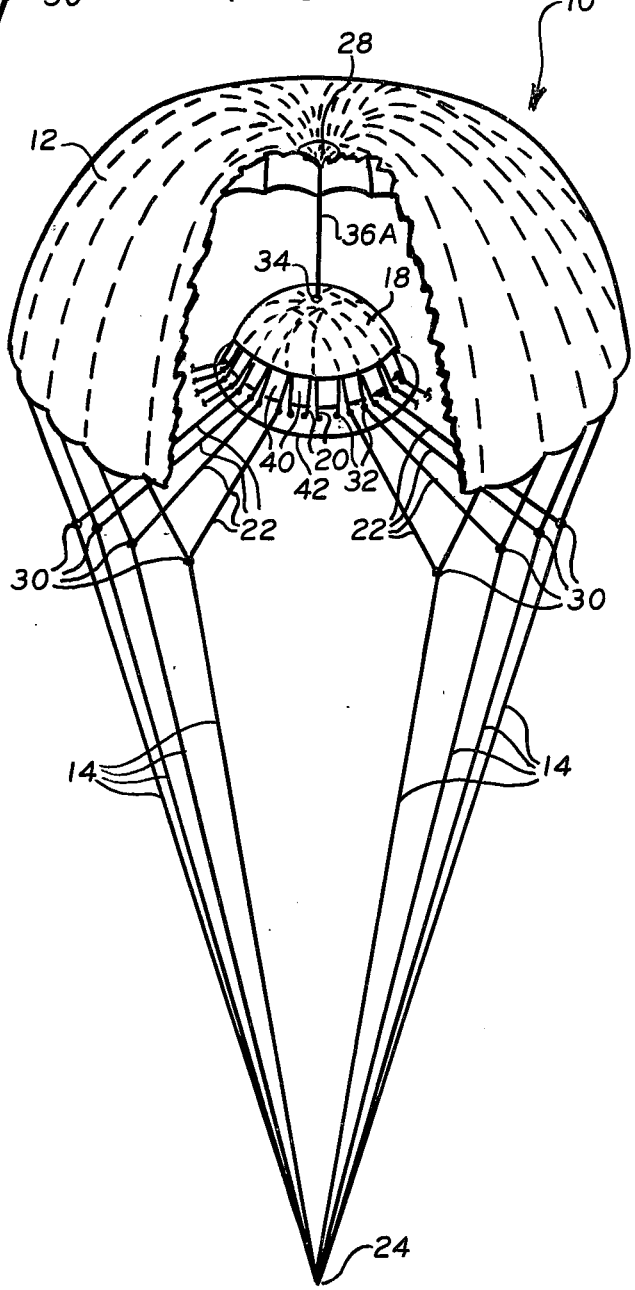

The above FIGS. schematically illustrate the parachute opening operation in a somewhat idealized sense. Furthermore, in order to illustrate the various stages, the FIGS. are not drawn to the same scale. For example, the auxiliary canopy in FIGS. 5 and 11 is enlarged to permit shown certain details.

In FIGS. 1 through 4 and 6 through 10, the line X — X indicates the skirt line of the main canopy and the line Y — Y indicates the skirt line of the auxiliary canopy.

DESCRIPTION OF THE PRREFERRED EMBODIMENTS

Referring first to FIGS. 1 through 5 which illustrate a first embodiment of the invention, there is shown a parachute 10 having a main canopy 12. Main support lines 14 extend down from canopy 12 and a load 16 is supported at the ends of the main support lines 14. An auxiliary canopy 18 is positioned within the main canopy 12 and is connected to the main support lines 14 through auxiliary support lines 20 and reefing lines 22. The reefing lines 22 are substantially lateral lines in the fully open state shown in FIG. 4 and are called reefing lines herein because of the reefing function performed by these lines.

As is known in the art, the main support lines 14 come together at a confluence point 24 to which the load 16 is connected. The support line 14, extend up along the inner surface of the gore seams of the main canopy 12 and are connected, in a conventional manner, to the canopy 12 at the skirt portion 26 and along the inner surface of the seam of the canopy 12. Each support line 14 runs across the inner surface of the seam of the canopy 12 and its two ends come together at the confluence point 28. Thus two lines 14 which are 180° apart are in fact the same continuous line.

Figure 3:
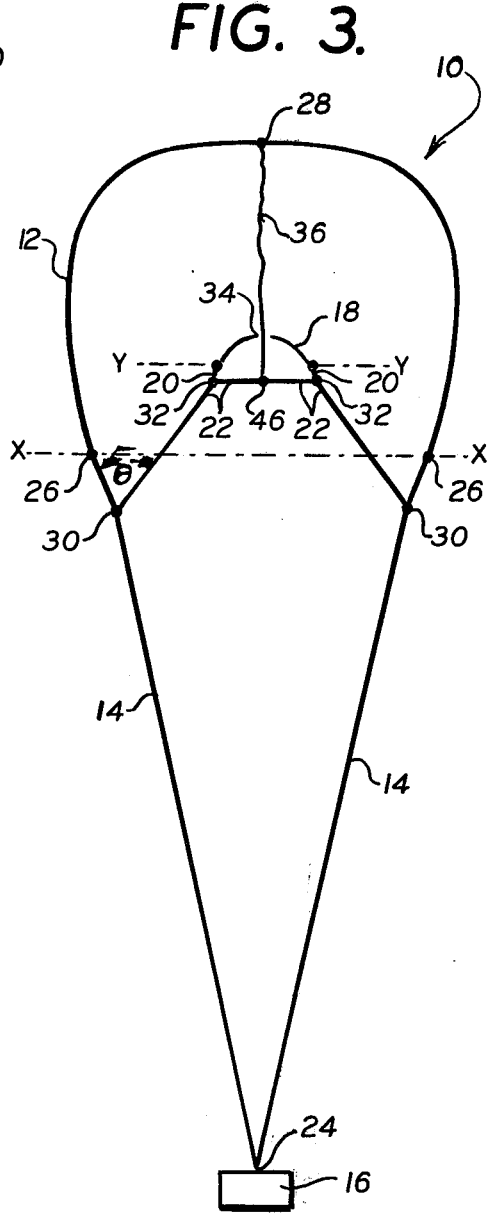

The auxiliary canopy 18 functions to assist the initial opening of the mouth of the main canopy 12 and thereby decrease the initial opening time. This is a function similar to that performed in the prior art by a comparable auxiliary canopy which is attached through auxiliary lines to the confluence point 28. However, as shown in the FIGS., there is included in this invention a set of reefing lines 22 that are connected across opposed main support lines 14. As may best be seen in FIG. 4, these reefing lines 22 are close to horizontal when the parachute is in the fully opened state. These reefing lines 22 serve a couple of related functions. They cooperate with the auxiliary canopy 18 during the initial opening stages; that is, the stage between FIG. 1 and FIG. 2, to aid in opening the mouth of the main canopy 12. At a later stage during the opening of the parachute, as represented by FIG. 3, these reefing lines serve to pull in the main support lines 14 during an intermediate stage of inflation and thus slow down the rate of parachute opening to reduce opening shock. During their initial opening function, the reefing lines 22 serve a reefing function that is somewhat different than the reefing function performed after the FIG. 2 state. More particularly, during the initial opening stage, the reefing lines 22 serve to tension and position the main canopy lines 14 and thus insure a repeatable, initial canopy mouth size and controlled circular shape for the canopy mouth opening. This initial control of the size and shape of the canopy mouth together with the fast initial opening of the mouth of the main canopy provides a fast controlled opening which will be similar in each chute of a given design so that the extreme condition for which the parachhute must be designed will be much closer to the normal opening condition than is otherwise the case. Accordingly, a more favorable design tradeoff may be had between parachute strength, opening speed and opening shock. Where the load 16 is equipment, rather than personnel, this tradeoff can be quite significant because the upper limit on opening shock is the strength of the parachute rather than the limit of what an individual person can stand.

The outboard ends of the reefing lines 22 are connected to the main support lines 14 at points 30. The auxiliary canopy 18 has a plurality of auxiliary canopy lines 20 which are connected to the reefing lines 22 at points 32. The reefing lines 22 are held in position relative to one another by being sewn to a marquisette panel, which panel is not shown in the FIGS. in order to provide a clearer illustration.

The auxiliary canopy 18 has an opening 34 at its apex. A positioning line 36 extends through the opening 34 and is connected between the center point of the reefing lines 22 and the apex of the main canopy 12. This positioning line 36 performs the important function of assuring that the reefing lines 22 and auxiliary canopy 18 are positioned within the main canopy 12 during the course of inflation.

The main support line 14 typically has a length of about 25 feet between the skirt 26 and the confluence point 24. In the embodiment shown, the connection point 30 is approximately 10% of that distance down form the skirt 26. The closer this connection point 30 is to the skirt, the stronger will the reefing action be during the opening of the parachute 10. However, when the reefing lines 22 are connected close to the skirt, the auxiliary canopy 18 will be further up within the main canopy 12. Up to a limit of about one foot, the closer the skirt of the auxiliary canopy 18 is to the mouth of the main canopy 12, the faster will the mouth of the main canopy 12 be opened at the beginning of parachute inflation. But, placing the auxiliary canopy 18 just within the mouth of the main canopy 12 will mean that the reefing lines 22 will be connected further down the main support lines 14 and the reefing effect will be somewhat decreased. Thus there is a trade off between the rapidity of initial opening and the amount of reefing to reduce opening shock. A presently preferred connection point 30 is one that is ninety percent of the distance up from the confluence point 24 to the skirt 26. But any connection down to about ⅓ of the distance between skirt 26 and confluence point 24 will provide significant reefing. The connection point 30 is selected depending upon whether emphasis is to be placed on speed of initial opening or on the reduction of shock. When reduction of shock is of maximum importance, connection at the skirt is preferred.

Reefing is the pulling in of the main canopy support lines 14. The amount of reefing will vary during the course of opening of the parachute. At the very beginning there will be no reefing because the auxiliary canopy 18 has not yet opened and, even when it first opens, the angle $\theta$ between the reefing lines 22 and the main support lines 14 will be very small. At the termination of parachute opening, when the parachute has reached its terminal descent velocity, the amount of reefing will be very small because the air speed is relatively low (for example about 12 knots) and thus the drag due to the auxiliary canopy 18 is minimal and the force on the reefing lines 22 is, therefore, minimal.

Accordingly, the main parameters which will affect the extent of the reefing are air speed and angle $\theta$ between reefing line 22 and main support line 14. The amount of reefing will tend to increase as that angle increass while the amount of reefing will tend to decrease as air speed decreases.

There is a third factor which affects reefing during the last portion of parachute opening where deceleration and thus shock is greatest. The third factor is the rate at which the auxiliary canopy 18 is pulled down toward the confluence point 24 during parachute opening. The absolute amount by which the diameter of the main canopy 12 increases during the last stage of opening is relatively great compared to earlier stages. Thus, as the main support lines 14 follow the skirt outwardly, the reefing lines 22 are pulled out more rapidly at this terminal stage. This pulls down the auxiliary canopy 18 quite rapidly with the consequence that the tension on the reefing lines 22 increases and the reefing increases. This factor is thus introduced at just the point where the main canopy 12 is opening fastest and where shock due to deceleration is greatest.

If the reefing lines 22 are connected at the skirt so as to maximize the magnitude of the reefing, then the auxiliary canopy 18 may be 7 to 8 feet from the mouth of the main canopy 12 when the parachute is in the deployed or squidded state. But the reefing lines 22 may be connected to a point 6 feet down from the skirt 26 along the 25 foot long main support lines 14. In that case, the reefing effect will be reduced somewhat but the auxiliary canopy 18 will be only about approximately 1-foot up from the mouth of the main canopy 12 and thus the auxiliary canopy 18 will tend to more quickly open the mouth of the main canopy during inflation. There is a trade-off between amount of reefing and speed of initial canopy opening that will be determined by where the reefing lines 22 are connected to the main support lines 14.

During the initial stages of opening, the presence of the auxiliary canopy 18 and of the reefing lines 22 tends to prevent what is known as blown perpheries. At times, when a parachute is deployed raggedly or unevenly, a portion of the skirt will blow through the support lines 14 and blow up around another portion of the skirt. This is a known phenomenon and produces known problems. The auxiliary canopy 18 and the reefing lines 22 tend to block the skirt from doing this. Furthermore, because of the reefing lines exert tension on the main load lines 14, they tend to pull the main load lines 14 into place so that the main load lines are all relatively evenly spaced from one another with the result that the main load lines tend to keep each skirt sector in a position which minimizes the blow through that causes blown peripheries.

In addition, during the early stages of opening, this tensioning of the main chute load lines 14 by the reefing lines 22 tends to create a radially symmetrical (i.e., circular) opening which minimizes the risk of having what is known as a false apex. A false apex occurs when the initial inrush of air is off center and hits the side of the canopy 12. This causes an excessive force and strain on the canopy which can result in tearing the canopy. When the canopy opening or mouth is symmetrical, the initial inrush of air hits the canopy around the central vent where the canopy is designed to take this force.

The control of the initial opening stages of the main canopy by the auxiliary canopy and reefing lines minimizes the possibility of main canopy damage. This control of the opening of the canopy also ensures repetitive consistent main canopy 12 opening times and shape sequences which in turn, keeps opening loads consistent (i.e., it reduces the random variation of opening loads experienced with standard canopies due to random canopy mouth shape and consequent air inflow variations).

In FIG. 5, four vent areas 38 are illustrated in the crown area of the main canopy 12. These vent areas 38 may be desirable in certain embodiments of this invention to provide increased outflow to suit the required inflow/outflow ratio that will govern the opening characteristics of the parachute and that will determine the final drag force of the parachute. Because the auxiliary canopy 18 and reefing lines 22 initiate and maintain a main canopy mouth area, during the initial stages of inflation, which is dependable and predetermined, there will be an increased inflow of air to the main canopy 12 during the initial stage of parachute opening. As a consequence, it is not only possible but may even be desirable to employ these vent areas 38 in order to increase outflow to provide reduced opening shock and provide further control on the opening characteristics of the parachute. These vent areas 38 would normally be covered with marquisette netting. But larger vent areas 38 might be employed if unidirectional stretch fabric is used to cover the vent areas. In such a case, the stretch fabric would respond to the initial inrush of air to stretch and provide the additional desired venting but by the time the parachute is slowed down to its terminal descent velocity, the stretch fabric will contribute to the final drag force. This is because the stretch fabric exhibits a porosity characteristic that varies in proportion to the dynamic air pressure on the fabric. If stretch fabric is used, it is preferable that the stretch direction run circumferentially.

In order to simplify the showing in FIGS. 1 - 4, certain preferred details of the auxiliary canopy 18 are not shown. However, as may be seen in FIG. 5, it is preferred that the auxiliary canopy 18 be designed to have a series of panels 40 at the skirt thereof. These panels 40 provide gore like vents between each panel 40. These vents between the panels 40 provide a more stable auxiliary canopy 18.

Marquisette netting is incorporated along the central portion of the reefing lines 22 in order to minimize line entanglement and canopy entanglement. To simplify the illustration, this marquisette netting is not shown. However, in FIG. 5, the circular line 42 indicates the outboard extent of the marquisette netting.

The relative proportions shown in FIGS. 1 - 5 are approximately correct but are modified, where convenient, in order to clearly illustrate the design shown. In one embodiment, employing a nominal 28 foot diameter personnel parachute, the following approximate dimensions might be employed. The main support lines 14 are each approximately 25 feet long from confluence point 24 to connection points 22 at the main canopy skirt line X — X. The reefing lines 22 are connected to the main support lines at points 30. The points 30 are approximately 2 feet down from the main canopy skirt line points 26. When fully opened, as shown in FIG. 4, the diameter of the mouth of the main canopy 12 is approximately 16.5 feet. The auxiliary support lines 20 are only three inches long between the skirt line Y — Y of the auxiliary canopy 18 and the reefing lines 22. The distance along each reefing line 22 between the point 30, where the reefing line is connected to the main line 14, and the point 44, where an auxiliary line 20 is connected to the reefing line, is approximately 6 feet. The auxiliary canopy 18 is approximately 5 feet in diameter and when fully opened has a mouth diameter of about 3.5 feet. In FIG. 5, eight of the main support lines 14 are shown although in this specific embodiment twenty eight such lines are employed. Since the reefing lines 22 run across the parachute between opposed support lines 14, there are only fourteen reefing lines 22. Since the reefing lines 22 run diametrically across the canopy the positioning line 36 is attached to the center crossover point 46 of the reefing lines.

FIGS. 6 through 11 illustrate a further embodiment of this invention in which a forshortened and strengthened positioning line 36A is used in order to provide substantially increased reefing effect during the opening of the parachute. The purpose of this increased reefing is to provide increased reduction in shock at the point where maximum shock tends to occur.

The structure and operation of this second embodiment of the invention is substantially similar to the first embodiment and the explanation given above substantially applies to the second embodiment. Accordingly, the same reference numbers are employed in indicating similar components in the two embodiments. However, to emphasize the fact that the positioning line is not only foreshortened but strengthened in the second embodiment, it is designated by reference number 36A in this embodiment.

Figure 1:
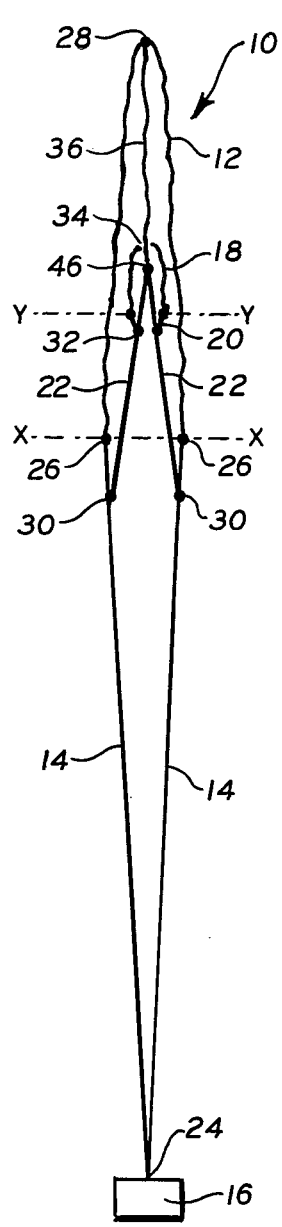
Figure 2:
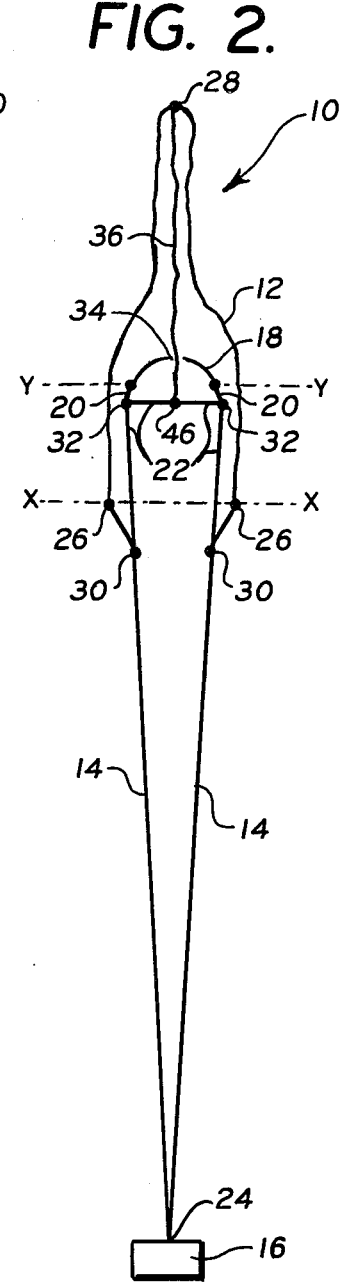

FIG. 6 represents the same squidded or deployed state shown in FIG. 1. It should be noted, however, that the foreshortened position line 36A causes the crown of the main canopy 12 to be pulled inward. FIG. 7 is a state similar to that of FIG. 2 in which the auxiliary canopy 18 has fully inflated and thus forces open the mouth of the main canopy 12, which mouth is formed and maintained with an essentially circular shape by the tensioning and positioning of the main canopy support lines 14 and by the air outflow from this small auxiliary canopy 18. At the stage shown in FIG. 7, no significant force is exerted through the positioning line 36A by the main canopy 12 since the inflow of air has not yet caused the crown of the main canopy 12 to provide a drag force.

FIGS. 8 and 9 indicate intermediate stages of main canopy 12 inflation somewhat analogous to the stage shown in FIG. 3. However, as shown in FIG. 9, as soon as the air reaches the crown of the main canopy 12, a substantial force is exerted on the positioning lines 36A which force is transmitted through the reefing lines 22 to the main canopy lines 14 thereby increasing the reefing effect and thus further reducing the shock level at that stage. Furthermore, at the FIG. 8 stage, the auxiliary canopy 18 will tend to take on a slightly different configuration than it does in the comparable FIG. 3 state.

As shown in FIG. 3, the positioning line 35 in the first embodiment is slack and thus only the auxiliary canopy 18 provides a drag that causes reefing. By contrast, in this FIG. 8 embodiment, both canopies 12 and 18 provide drag which contributes to reefing. FIG. 9 shows a further stage in the opening in which the increasing drag on the positioning line 36A increases the reefing effect on the main lines 14, to partially counteract and balance the outward inflation forces on the main canopy 12. Thereby, the inflation rate is slowed and the shock on the personnel or other load 16 is reduced.

Figure 10:
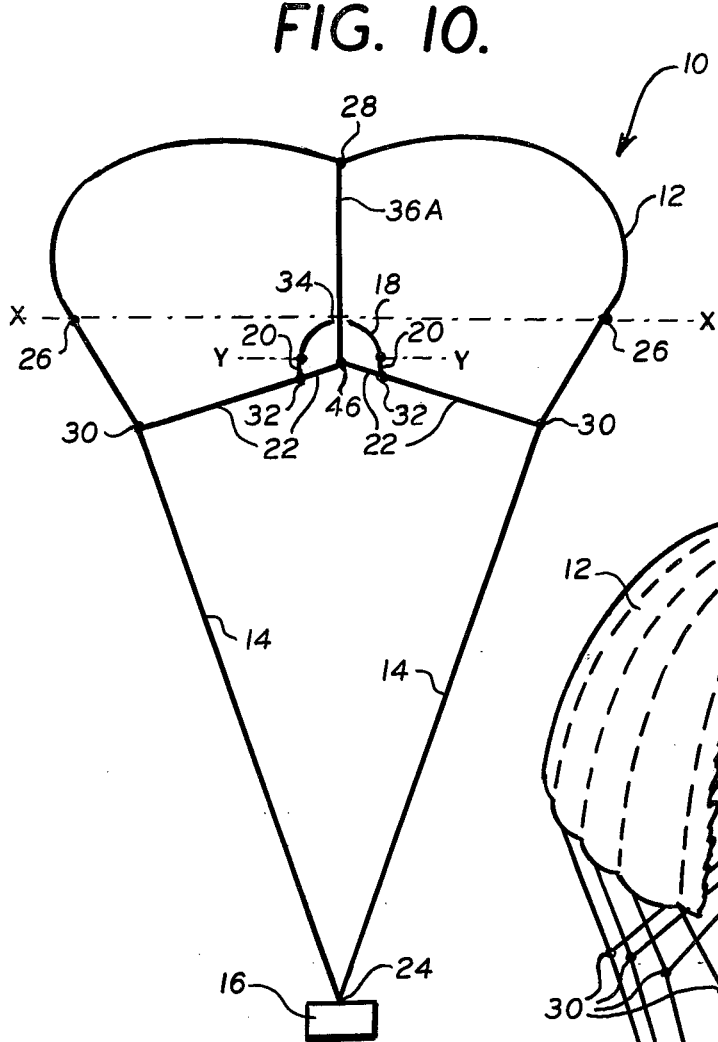

FIG. 10 shows a fully inflated state in which the parachute has reached its terminal descent velocity and this is analogous to FIG. 4, except that in the FIG. 4 embodiment the positioning line 36 is not foreshortened. However, because of the foreshortened positioning line 36A the main canopy 12 bulges is shown to result in a slightly increased mouth diameter. This, together with the pulling down of the central vent at the apex 28, provides a slightly higher drag at the final descent velocity than is the case with the basic parachute canopy shown in FIG. 4.

The degree of additional reefing thus obtained can be controlled to a large extent by the choice of length of positioning line 36A. The shorter the positioning line 36A, the more the main canopy crown area will be used to assist the reefing effect. Furthermore, the length of the positioning line 36A will effect the proportion of the inflation process during which the positioning line 36A will assist the reefing effect. If the positioning line 36A is only slightly reduced, then during certain stages of inflation, the main canopy crown area may move further towards the main canopy line confluence point than does the center point of the reefing lines 22. This, depending upon the total geometry, could cause the positioning line 36A load to drop to zero at some point during the inflation process. If the positioning line 36A is shortened sufficiently, there will be some reefing force due to this positioning line 36A during the entire inflation process.

Although two main embodiments and variations in those embodiments have been described, there are other variations which can be made without departing from the scope of this invention.

For example, although the above embodiments show the reefing lines 22 connected to the main canopy support lines 14 at some short distance below the skirt of the main canopy, there may be circumstances in which the reefing lines are connected at the skirt of the main canopy. The trade-off in such a design would mean somewhat less rapid initial opening of the mouth of the main canopy but would also mean a more substantial reefing and control of the shape of the mouth of the main canopy during opening.

The embodiments disclosed show the reefing lines 22 connected approximately 2 feet down from the skirt line X — X along the main canopy line 14 that is 25 feet from skirt line to confluence point 24. In order to optimize reefing, it is preferred that this connection point 30 be more than 90% of the distance up from the confluence point 24 to the skirt line connections 26. However, it is contemplated that these connection points 30 could be as much as one-third of the way down from the skirt line connection points 26 in embodiments where it is desired that the mouth of the main canopy 12 open as quickly as possible initially even though this means somewhat reduced reefing and reduced control over opening shock.

For non-personnel parachutes, the size of the auxiliary canopy may be increased relative to the main canopy up to as much as 10% to 12% of the area of the main canopy. Such a relatively larger auxiliary canopy will result in faster initial opening of the main parachute and will also provide a somewhat greater subsequent reefing to prevent canopy damage at the point of maximum shock.

The reefing lines could be reduced in number and connected to fewer than all of the main support lines to provide a parachute in which there would be more limited reefing and where cost and weight would be reduced.

What is claimed is:

1. A parachute having rapid initial opening and controlled opening shock comprising:
    a main canopy having a skirt portion
    a plurality of support lines connected to said main canopy, each of said support lines having an end connected to a common confluence point,
    an auxiliary canopy positioned within said main canopy when the parachute is in a squidded state,
    the skirt of said auxiliary canopy being positioned a substantial distance above said skirt of said main canopy in said squidded state, and
    a plurality of reefing lines, each of said reefing lines being fixidly connected to a respective one of said support lines at a point remote from said confluence point and below said canopy skirt portion,
    said auxiliary canopy being connected to said reefing lines,
    said point at which said reefing lines are connected to said support lines being sufficiently close to said skirt of said main canopy so that, during inflation, the force exerted by said auxiliary canopy on said reefing lines will provide substantial reefing of said canopy and so that on initial opening, said reefing lines will control the shape and size of the mouth opening of said main canopy.

2. The parachute of claim 1 wherein said reefing lines comprise:
    laterally extending lines which extend radially outwardly from the main axis of the parachute when said main canopy is open and are spaced from and below said auxiliary canopy when said main canopy is open.

3. The parachute of claim 2 further comprising:
    auxiliary canopy lines connected to said auxiliary canopy, each of said auxiliary lines having an outboard end connected to said reefing lines.

4. The parachute of claim 1 wherein: said point of connection of each of said reefing lines to the corresponding one of said support lines is more than two-thirds the distance up said support lines from said confluence point to said skirt.

5. The parachute of claim 1 wherein: said point of connection of each of said reefing lines to the corresponding one of said support lines is more than 90 percent of the distance up said support lines from said confluence point to said skirt.

6. The parachute of claim 3 wherein: said point of connection of each of said reefing lines to the corresponding one of said support lines is more than two-thirds the distance up said support lines from said confluence point to said skirt.

7. The parachute of claim 3 wherein: said point of connection of each of said reefing lines to the corresponding one of said support lines is more than ninety percent of the distance up said support lines from said confluence point to said skirt.

8. The parachute of claim 1 further comprising: a positioning line connecting the apex of the main canopy and the center of said reefing lines, said positioning line extending through an opening in the apex of said auxiliary canopy.

9. The parachute of claim 3 further comprising: a positioning line connecting the apex of the main canopy and the center of said reefing lines, said positioning line extending through an opening in the apex of said auxiliary canopy.

10. The parachute of claim 5 further comprising: a positioning line connecting the apex of the main canopy and the center of said reefing lines, said positioning line extending through an opening in the apex of said auxiliary canopy.

11. The parachute of claim 7 further comprising: a positioning line connecting the apex of the main canopy and the center of said reefing lines, said positioning line extending through an opening in the apex of said auxiliary canopy.

12. The parachute of claim 8 wherein: said positioning line is relatively foreshortened to transmit a reefing force from the crown of said main canopy to said support lines during at least some stage of the opening of the parachute.

13. The parachute of claim 9 wherein: said positioning line is relatively foreshortened to transmit a reefing force from the crown of said main canopy to said support lines during at least some stage of the opening of the parachute.

14. The parachute of claim 10 wherein: said positioning line is relatively foreshortened to transmit a reefing force from the crown of said main canopy to said support lines during at least some stage of the opening of the parachute.

15. The parachute of claim 11 wherein: said positioning line is relatively foreshortened to transmit a reefing force from the crown of said main canopy to said support lines during at least some stage of the opening of the parachute.

16. The parachute of claim 1 wherein said main canopy includes a plurality of vent areas spaced from the normal control vent area.

17. The parachute of claim 3 wherein said main canopy includes a plurality of vent areas spaced from the normal control vent area.

18. The parachute of claim 16 wherein each of said plurality of vent areas is covered by a stretch fabric.

19. The parachute of claim 17 wherein each of said plurality of vent areas is covered by a stretch fabric.

* * * * *